Apr. 17, 1923. 1,451,868
C. DAHL
OCCUPANT STEERED VEHICLE
Filed Nov. 25, 1921  2 Sheets-Sheet 1
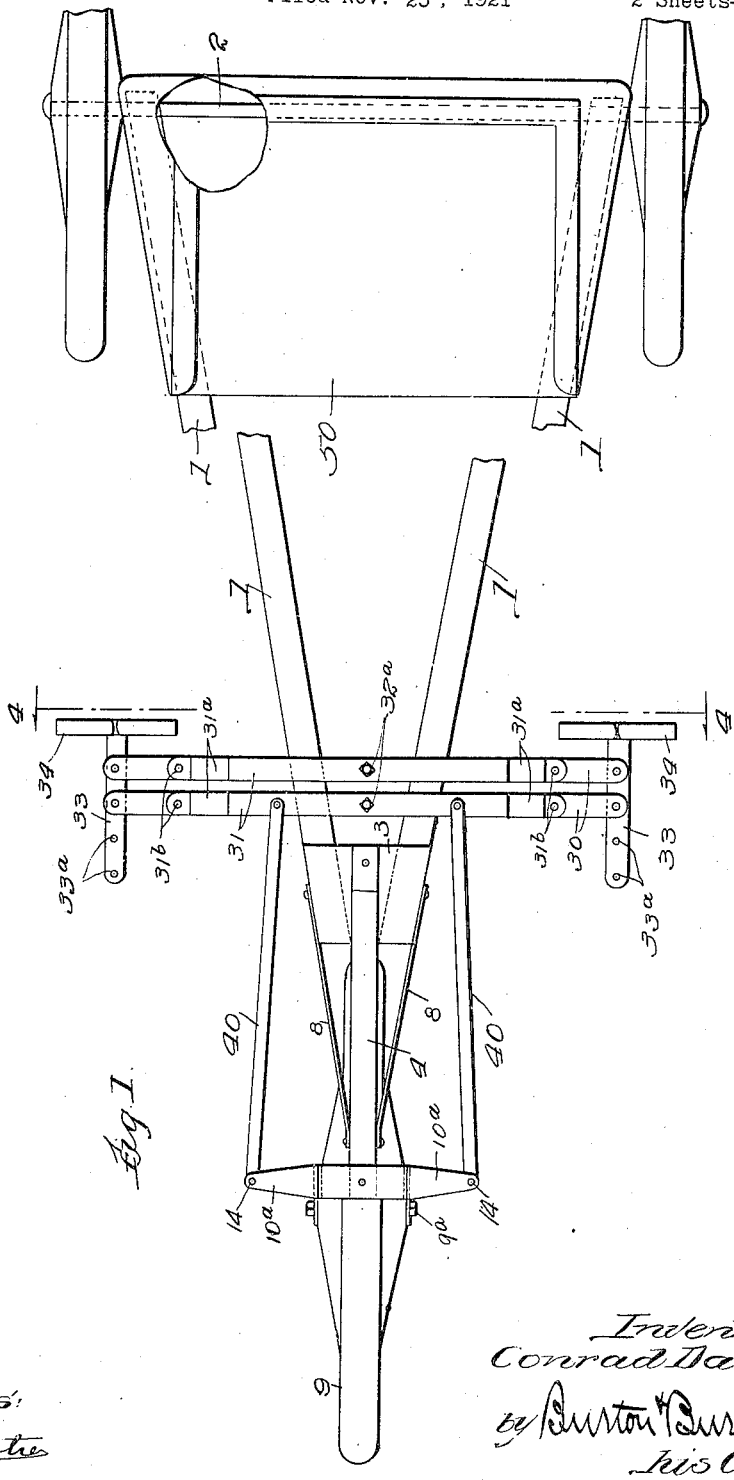
Inventor:
Conrad Dahl,
by Burton & Burton
his Attys.
Witness:

Apr. 17, 1923.                                                              1,451,868
                                    C. DAHL
                            OCCUPANT STEERED VEHICLE
                              Filed Nov. 25, 1921                2 Sheets-Sheet 2
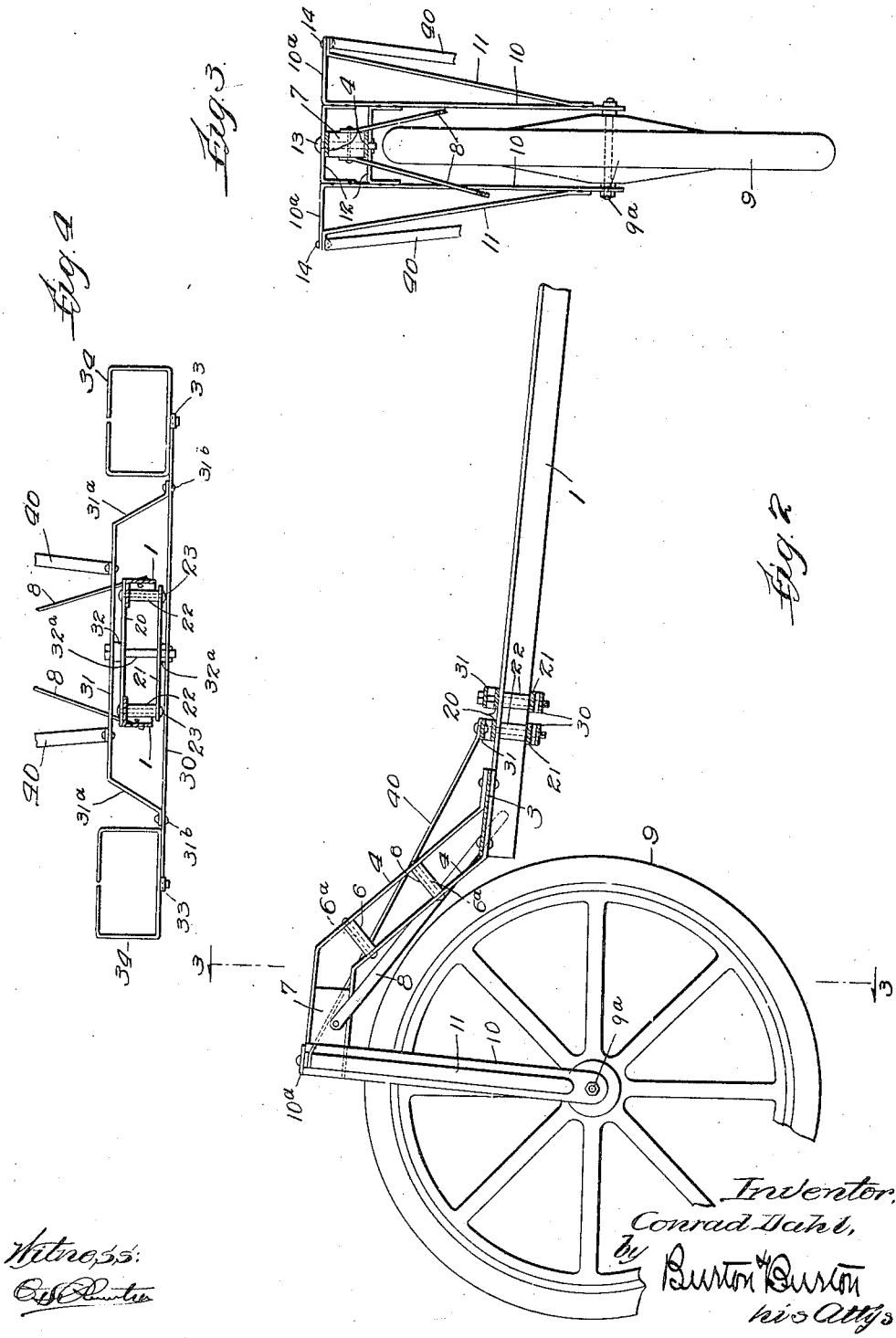

Patented Apr. 17, 1923.

1,451,868

UNITED STATES PATENT OFFICE.

CONRAD DAHL, OF CHICAGO, ILLINOIS, ASSIGNOR TO DONALD M. CARTER, TRUSTEE, OF CHICAGO, ILLINOIS.

OCCUPANT-STEERED VEHICLE.

Application filed November 25, 1921. Serial No. 517,443.

*To all whom it may concern:*

Be it known that I, CONRAD DAHL, a citizen of the United States, residing at Chicago, in the county of Cook and State of Illinois, have invented certain new and useful Improvements in Occupant-Steered Vehicles, of which the following is a specification, reference being had to the accompanying drawings, forming a part thereof.

The purpose of this invention is to provide an improved construction of a vehicle adapted to be steered by the occupant by means of a forward steering wheel operated by a pedal lever or levers, mounted at a position on the frame below the level of the top of the vehicle. It consists in the elements and features of construction, shown and described, as indicated in the claims.

In the drawings:—

Figure 1 is a plan view of a vehicle embodying this invention, the frame structure being broken away at the middle part to condense the view.

Figure 2 is a vertical fore-and-aft sectional view comprising the forward portion of the main frame and the steering frame and steering wheel.

Figure 3 is a section at the line, 3—3, on Figure 2.

Figure 4 is a section at the line, 4—4, on Figure 1.

In the structure shown in the drawings, the main frame comprises two side bars, 1, 1, which extend rigidly from the rear axle, 2, which connects them together, convergingly forward to a point just behind the forward steering wheel where they are secured together by a tie plate, 3. From this tie plate, the two inclined bars, 4, 4, one above the other extend up forwardly to a point above the top of the steering wheel and are there bent to extend substantially horizontally forward parallel to each other to a head block, 7, which is interposed between them and to which they are both secured, said head block affording the substantially vertical journal bearing for the steering frame. The bars, 4, 4, form substantially a truss which is stiffened by the struts, 6, 6, these struts being in the form of spacing sleeves on the bolts, 6ª, which clamp the bars together upon the spacers. The truss described which terminates in and holds the steering head is braced laterally by oblique braces, 8, 8, extending from the opposite sides of the steering blocks, 7, divergingly down and rearward to the forward end portion of the rigid frame bars, 1, to which said braces are respectively secured at their rear lower ends. The head block, 7, is thus very rigidly secured with respect to the rigid side bars, 1, 1, being braced in vertical and horizontal planes as described.

The steering frame comprising vertical side bars, 10, 10, connected together at the lower ends by the steering wheel axle or spindle, 9ª. At their upper ends said bars, 10, are each spread outwardly at right angles forming oppositely-extending steering arms, 10ª, 10ª; and at said upper ends these bars, 10, 10, are definitely spaced apart and held parallel by bars, 12, 12, which are bent at right angles at both ends, forming downturned lug members which are spot-welded or otherwise rigidly secured inside the bars, 10, 10, respectively, so that by said two bars, 10, 10, and said two cross members, 12, 12, a rectangular space is definitely bounded within which the steering head, 7, is positioned, fitting between the upper and lower bars, 12, 12, the king bolt or steering frame pivot spindle or king bolt, 13, being set through said bars, 12, 12, and through the head block, for pivoting the steering frame to the main frame member. The steering arms, 10ª, 10ª, are rigidly braced in their oppositely extending horizontal positions by oblique braces, 11, 11, extending from the ends of said steering arms, 10ª, 10ª, respectively, down convergently to the bars, 10, 10, to which they are respectively secured, as by spot welding, at their lower ends. At their upper ends the oblique bars, 11, 11, have outwardly bent ends which lap under the ends of the arms, 10ª, 10ª, for securement thereto, which securement is effected by the bolts, 14, 14, which constitute pivotal connection of steering links hereinafter described to said steering arms, 10ª, 10ª.

For operating the steering wheel, 9, a foot-operated structure is provided consisting of two parallel lever members extending transversely of the main frame and pivoted thereto at their middle points and connected at their opposite ends by parallel pedal-carrying links, so that said parallel links and levers are at all times maintained in parallel relation throughout their pivotal action about their respective pivots and the pedals on said links have all their positions parallel.

In detail each of these lever members comprises a main bar, 30, which extends across the main frame underneath the bars, 1, 1, and an upper stiffening bar, 31, which extends across said frame above the bar, 31, having its ends bent down as seen at 31ª, and thence turned outwardly for lapping on the bar, 30, and being secured thereto as shown at 31ᵇ, at a distance inward from the end of said bar, 30. For pivoting these lever members on the main frame there are provided, crossing the bars, 1, 1, above and below the same and parallel to each other, flat bars, 20, 20, above, and 21, 21, below said main frame bars. The main frame bars being of angle iron, as seen in Figure 4, the bars, 20, are lodged upon the upper side of the horizontal flanges of said angle iron and the bars, 21, are spaced away from the lower side of said horizontal flanges by spacing sleeves, 22, 22, on the bolts, 23, 23, which secure and clamp the two bars, 20 and 21, together and to said horizontal flanges of the side bars, 1, 1.

The bars, 30 and 31 of the pedal steering levers extend crosswise of the frame in the same vertical plane as the bars, 20 and 21, being spaced from said bars by spacing washers, 32 above and 32ª, below said bars 20 and 21, respectively, a pivot bolt taking through all four bars, that is to say, the upper bar, 31 of the lever, the upper cross bar, 20, on the main frame, the lower cross bar, 21, and the lower or main bar, 30, of the lever. The two levers thus constructed and mounted are connected together as above mentioned, by parallel links, 33, at their opposite ends, said links being extended beyond the pedal levers in both directions, and at their rear ends having rigidly secured to them, pedals, 34, 34. The extension of the links forwardly of the lever is for the purpose of making provision for their adjustment fore-and-aft on the pedal levers to accommodate the length of limb of the operating occupant of the vehicle. For this purpose said links are provided with a plurality of bolt holes as seen at 33ª, 33ª, at any two consecutive of which holes the link may be connected to the lever. For operating the steering frame from the pedal lever, links, 40, 40, extend from the forward one of the two parallel pedal levers up obliquely forward and outward to the steering arms, 10ª, 10ª, of the steering frame, where they are connected as above stated by the bolts, 14, 14.

50 represents the occupant's seat from which the pedals, 34, 34, may be reached by his feet for steering the vehicle.

Means of propulsion of the vehicle are not shown and any suitable propelling means may be employed with the above described structure of frame and the steering mechanism.

I claim:—

1. An occupant-steered vehicle, comprising in combination with rear drive-and-carrying wheels and a front steering wheel, a frame structure consisting of a main frame having the journal bearings for the driving and steering wheel, and a steering frame for the steering wheel, the main frame having a steering head through which the steering frame is pivoted for steering movement, a foot-operated steering lever pivoted on the main frame behind the steering wheel, the steering frame being extended laterally at the top to form outwardly-projecting steering arms, and links connecting the opposite ends of the foot-operated levers respectively, with the opposite ends of the steering head arms, the pivot of the foot lever and all the pivots of the links being parallel to the pivot bearing of the steering frame in the steering head.

2. An occupant-steered vehicle comprising in combination with rear drive-and-carrying wheels and a front steering wheel, frame structure consisting of a main frame having the journal bearings for the driving and carrying wheels, and a steering frame having journal bearings for the steering wheel, the main frame being positioned approximately at the level of the drive wheel journal bearings from said bearings forward to a point just behind the steering wheel, and thence extending up forwardly and comprising a bearing for the steering wheel frame above the steering wheel; a foot-operated steering lever structure pivoted on the frame back of said upward and forward extending part, and links connecting the opposite arms of said foot steering lever structure with the opposite arms respectively of the steering frame, the several parts being proportioned to render the steering frame pivot bearings inclined rearward when the wheels are all on the ground, and the pivots of the foot lever and all the pivots of the links being parallel to said inclined steering frame pivot bearings.

3. An occupant-steered vehicle comprising in combination with the rear drive-and-carrying wheels and a front steering wheel, a frame structure consisting of a main frame having the journal bearings for the driving-and-carrying wheels, and a steering frame having journal bearings for the steering wheels, the main frame having a steering head to which the steering frame is pivoted for steering movement, and the steering frame having oppositely-extending steering arms; a foot-operated steering lever structure pivoted on the main frame back of the steering wheel, comprising a pair of equal and parallel lever members pivoted on parallel pivots one behind the other on the main frame; a plurality of links all parallel to the plane in which the parallel pivots of said lever member are situated, connecting said parallel lever members, and links connecting the opposite arms of one of said lever members with the steering frame arms respectively.

4. An occupant-steered vehicle, comprising in combination with rear drive and carrying wheels, and a front steering wheel, frame structure consisting of a main frame having journal bearings for the drive-and-carrying wheels, and a steering frame for the steering wheel, said main frame comprising a rigid structure extending from the rear axle to a point behind the steering wheel, two bars secured to the forward end of said rigid structure extending obliquely up forward, one above the other, and thence extending approximately horizontally at their forward terminals, and a block embraced and secured between said terminals, having the steering frame pivot bearing; the steering frame comprising upright and transverse bars secured together to enclose a rectangle between whose upper and lower sides the head-block-embracing bars are embraced, and a pivot bolt connecting said embraced and embracing parts.

5. An occupant-steered vehicle comprising in combination with rear drive and carrying wheels, and a front steering wheel, a frame structure consisting of a main frame having the journal bearings for the driving-and-carrying wheels, and a steering frame having journal bearing for the steering wheel, said main frame comprising a rigid structure extending from the rear axle to a point behind the steering wheel and two bars secured to the forward end of said rigid structure extending obliquely up forward one above the other and both bent to form approximately horizontal terminals; a head block embraced and secured between said terminals, having the steering frame pivot bearing, and lateral braces secured to the opposite sides of the head block and extending divergently obliquely down rearward and secured at their lower rear ends to the forward end portion of the first mentioned rearward structure; whereby the head block is braced both vertically and horizontally in fixed position with respect to said rigid structure of the frame.

6. In the structure defined in claim 3 foregoing, each of said foot-operated levers comprising an upper and a lower bar in the same vertical plane, one above and the other below the low part of the main frame behind the steering wheel, the pivots of said foot-operated levers to the main frame, extending through said main frame and said upper and lower bars of the lever.

7. In the structure defined in claim 3, foregoing, steering pedals carried on said steering-lever-connecting links, said links being provided with means for securing them at a plurality of fore-and-aft positions, and operating pedals carried upon the rear ends of said links.

In testimony whereof, I have hereunto set my hand at Chicago, Illinois, this 26th day of October, 1921.

CONRAD DAHL.